Figure 1:
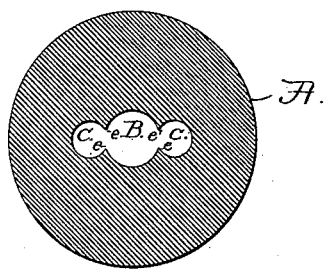

(No Model.)

W. C. McINTIRE.
CUSHION TIRE FOR BICYCLES.

No. 470,915. Patented Mar. 15, 1892.

Witnesses
Curtis Hammond
Thos. E. Robertson

Inventor
Wm. C. McIntire

THE NORRIS PETERS CO., PHOTO-LITHO., WASHINGTON, D. C.

United States Patent Office.

WILLIAM C. McINTIRE, OF WASHINGTON, DISTRICT OF COLUMBIA.

CUSHION-TIRE FOR BICYCLES.

SPECIFICATION forming part of Letters Patent No. 470,915, dated March 15, 1892.

Application filed December 28, 1891. Serial No. 416,302. (No model.)

*To all whom it may concern:*

Be it known that I, WILLIAM C. MCINTIRE, a citizen of the United States, residing at Washington, in the District of Columbia, have invented certain new and useful Improvements in Cushion-Tires for Bicycles and other Vehicles; and I do hereby declare the following to be a full, clear, and exact description of the invention, such as will enable others skilled in the art to which it appertains to make and use the same.

My invention relates to certain new and useful improvements in "cushion-tires" for bicycles; and it has for its objects not only to provide a substantial and effective air-cushion within the body of the rubber of which the tire is composed, but to also avoid the cutting action which usually takes place.

In tires of the class to which my invention relates it has been most common to form them with a cylindrical hollow air-space; but with this form of construction experience has demonstrated that the constant compression or partial flattening of the tire causes the rubber on each side of the central air-space to form an acute angle and that this constant action tends to cut or split the rubber in a diametric line, thus soon depriving it of its original and desired elasticity and in a short time rendering it useless. It has been suggested to overcome the disadvantages just described by forming tires with two ribs or reinforcements, one on each side of the inner surface; but, while this construction may add increased strength at the lines where they exist, the cushioning effect of the interior air-space is correspondingly decreased.

My invention is designed to overcome the disadvantages of both of the described constructions and at the same time secure the desirable effect of the air-cushion to its greatest extent; and with these ends in view my invention consists of a tire having a central air-space communicating with air-spaces on each side of the said central space, the relation and form of the three air-spaces being such that continuous heels or projections are formed each side of the central space, which heels shall come in contact when the tire is compressed and serve not only as elastic supports, but at the same time constitute walls or partitions between the central space and the two outside air-spaces, thus, as it were, dividing the original single air-space into three parallel air-spaces. Not only is this result secured, but, by reason of the supporting contact of the heels or projections, the outside portion of the circumference of the two lateral air-spaces is protected from the cutting action which occurs in tires having a single central air-space, for the reason that such outside lines of the lateral air-spaces always maintain a curved direction and never assume the acute-angle form occurring in the single circular air-cushion.

My invention will be readily understood by reference to the accompanying drawings, in which—

Figure 2:
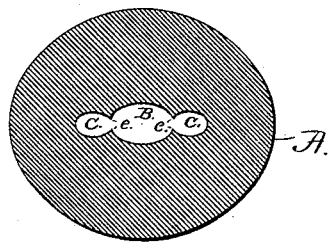
Figure 3:
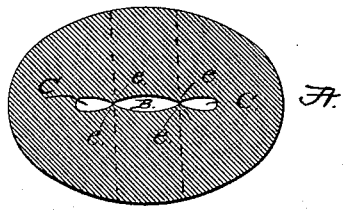

Figure 1 represents a cross-section of a rubber tire; Fig. 2, a similar view showing the tire partially compressed, and Fig. 3 a similar view showing the tire compressed to the full extent which occurs in use.

Similar letters denote like parts in the several views.

A represents the tire, which is formed of rubber and properly vulcanized, as is well understood in the manufacture of such goods.

B represents a central cylindrical air-space extending throughout the whole length of the tire, and C C represent contiguous parallel auxiliary air-spaces communicating laterally throughout their whole extent with the central air-space B. I have shown the three air-spaces as cylindrical in form and with the two outside or parallel spaces C C of just half the diameter of the central air-space B, the centers of the spaces C C bearing such relation to the center of space B that the circumference of the latter is intersected by the circumference of each of the spaces C C, thus forming continuous heels or projections *e e*. It will be observed that when the compression of the tire takes place the heels *e e* approach each other, as seen at Fig. 2, and finally come in contact with and support each other and form, as it were, walls or partitions between the outside spaces C C and the central space B, these walls or partitions constituting parallel elastic supports in the direction indicated by dotted lines in Fig. 3, and it will also be seen that when this condition and relation of the air-spaces is assumed that the inside surface of the spaces C C at the points farthest from the center of the tire maintain a curved direction, and thus the cutting action referred to is avoided.

While I prefer to make the air-spaces cylindrical in cross-section, it will be understood that I do not wish to confine myself to exact lines of contour, nor do I wish to be understood as limiting myself to the exact proportions named, as variations in these particulars may be made without departing from the spirit of my invention so long as there exists the parallel and contiguous air-spaces with heels or projections produced by the intersection of the boundaries of the three air-spaces.

What I claim as new, and desire to secure by Letters Patent, is—

1. A rubber tire for bicycles and other vehicles, formed with a central air-space bounded on each side by parallel and intersecting air-spaces, substantially as hereinbefore set forth.

2. A rubber tire for bicycles and other vehicles, having a central air-space B, two parallel and intersecting air-spaces C C, and continuous heels or projections e e, substantially as and for the purposes set forth.

In testimony whereof I affix my signature in presence of two witnesses.

WM. C. McINTIRE.

Witnesses:
CURTIS LAMMOND,
D. G. STUART.